April 6, 1954 R. HELL 2,674,654

APPARATUS FOR SYNCHRONIZING FACSIMILE PRINTERS

Filed Aug. 5, 1950

Inventor:
Rudolf Hell.
By [signature] Atty

Patented Apr. 6, 1954

2,674,654

UNITED STATES PATENT OFFICE 2,674,654

APPARATUS FOR SYNCHRONIZING FACSIMILE PRINTERS

Rudolf Hell, Kiel-Dietrichsdorf, Germany, assignor to Siemens & Halske, Aktiengesellschaft, Munich, Germany, a corporation of Germany Application August 5, 1950, Serial No. 177,822

Claims priority, application Germany January 21, 1950

13 Claims. (Cl. 178—69.5)

This invention is concerned with apparatus for synchronizing facsimile printers, particularly receivers employed in the transmission of symbols in a system, for example, of the type described in co-pending application Ser. No. 170,552, filed June 27, 1950, wherein the symbols are individually analyzed and subdivided into component elements such as image dots for transmission in the form of fixed series of signal impulses which are continuously scanned or sensed at the receiving end. The scanning or sensing of the signal impulses controls the printing of the image elements to form the corresponding symbols which constitute a message.

Previously proposed systems provide for synchronization only during the transmission of the signal impulses constituting the image elements, omitting synchronization during intervals between words and generally during intervals between the transmission of signal impulses. It is clear therefore that the drive for the printer apparatus at the receiving end may fall out of synchronism during such intervals, causing gradual upward or downward shifting of the printed lines. Attempts made in the past to incorporate individual synchronizing impulses during such transmission intervals have not been fully successful, because the synchronizing impulses might distort the symbol images and thus adversely affect their legibility.

In order to synchronize the transmission, the invention proposes to transmit synchronizing impulses which are uniformly superimposed on the signal impulses and also appear during the transmission intervals, such superimposed impulses being used at the receiving end for the purpose of synchronizing the drive motor of the corresponding printer apparatus and being filtered out from or suppressed in the circuit which controls the printing of the symbols. The advantage consists in uninterruptedly maintaining synchronization throughout the entire transmission without adversely affecting the legibility of the printed symbols.

While the invention is of particular significance in connection with printers furnishing sheet records, it is likewise applicable to tape printers and will substantially enhance their utility.

The identical carrier frequency is preferably used for the transmission of the superimposed impulses and for the symbol signal impulses. The impulse frequency of the superimposed impulses may be higher or lower than the frequency of the symbol signal impulses, or it may be identical with it, but is preferably of the same range.

The means at the receiving end for filtering out the superimposed impulses may be kept simple in accordance with the invention, in view of the fact that the impulse frequencies of the superimposed impulses and of the symbol signal impulses bear a rational relationship. It is particularly suitable to make one an integral multiple of the other, or to make both identical. It is possible by such a choice of impulse frequencies to transmit the superimposed impulses in phase with the symbol signal impulses.

The above indicated operation is accomplished by separately producing at the sending station the symbol signal impulses and the impulses to be superimposed thereon, mixing such impulses and causing their operative release only responsive to the generation of one of the two impulses, while transmission is inhibited either in the absence of impulses or in the simultaneous presence of symbol signal impulses and of the impulses to be superimposed. The reverse is the case in a modified arrangement in which sending or transmission takes place in the presence of double impulses and also in the absence of impulses, and in which individual impulses are suppressed.

In accordance with a further embodiment of the invention, the frequency of the superimposed impulses, or a multiple thereof, is filtered out at the receiving end and is employed for synchronizing the driving unit of the corresponding printer apparatus.

Another method which may be employed for synchronization in accordance with the invention resides in suppressing the superimposed impulses by suitable cam control means during the sensing or scanning of a line zone, for example, the marginal zone, and then effecting the synchronization by auxiliary sensing or scanning of such marginal zone. A particularly suitable embodiment for the marginal synchronization results from the use of identical impulse frequencies for the symbol signal impulses and for the superimposed impulses.

If the length of the superimposed impulses is made equal to the maximum length of a symbol line—the impulses corresponding, e. g., to the five or more image dots of a vertical I-stroke—and, if care is taken that transmission takes place only for individual impulses, a bright type or symbol image will appear in normal reception upon a dark background. In order to obtain positive types, negative printing is accomplished at the receiving end, e. g., by suitably constructing the corresponding printing system or by feeding a blocking voltage to the receiver rectifier stage coincident with the impulses. Since the marginal zone would in such case appear dark, the invention proposes to screen out the scanning thereof at the receiving end by means of a control cam or other suitable means.

The objects indicated in the foregoing discussion and additional objects and features of the invention will appear from the detailed description of the accompanying drawings illustrating, in more or less schematic manner, some embodiments to give examples. In these drawings, Fig. 1 shows in diagrammatic circuit representation means at the transmitter for producing impulses and for controlling the transmission thereof;

Known elements will be discussed only to the extent required for conveying an understanding of the invention. The co-pending application mentioned before may be consulted for details concerning certain aspects of the system, and portions thereof which are pertinent to the present disclosure should be treated as if they were included herein.

Figures 1, 2:
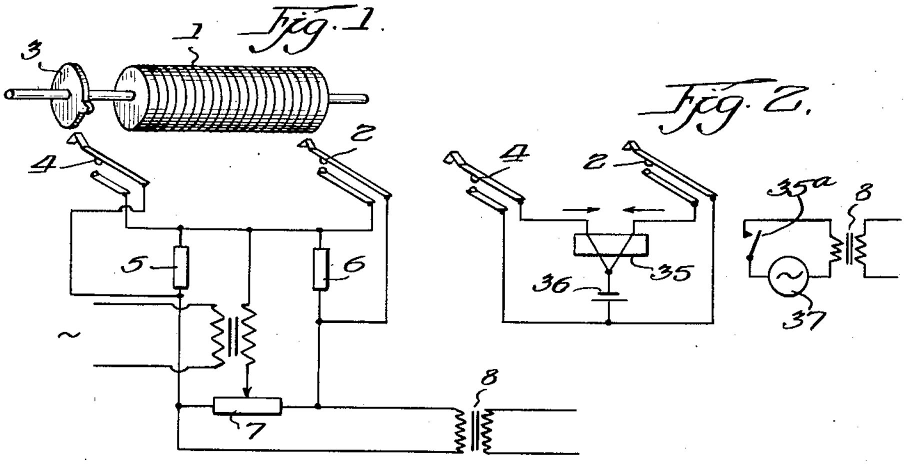
Fig. 2 shows a modified circuit for use in place of the circuit shown in Fig. 1.

Referring now to Fig. 1, numeral 1 indicates rotatable cam means for controlling a number of contacts such as 2, only one such contact being shown for convenience, to produce signal impulses corresponding to image elements of the symbols to be transmitted. Upon the drive shaft of the cam means 1 is disposed a cam 3 which produces, by coaction with contact 4, uniform alternations, e. g., of 50 cycles. The contacts 2 and 4 are connected in a bridge circuit, the arms of which are formed by the impedances 5, 6 and 7. The impedance 7 forms two bridge arms, being tapped at the middle and being connected to an alternating current source through a transformer, as shown. The bridge is in equilibrium when the two impedances 5 and 6 are either simultaneously fully in circuit or simultaneously short-circuited by the associated contacts 4 and 2, respectively. There is no potential at the terminals of the impedance 7 in such instances, and accordingly no transmission of impulses over the line which extends from the transformer 8. An alternating current potential is set up across the terminals of the impedance 7 only when the equilibrium of the bridge is disturbed by the closure of either contact 4 or contact 2, and such potential is transmitted in the form of an impulse through the transformer 8.

Figure 3:
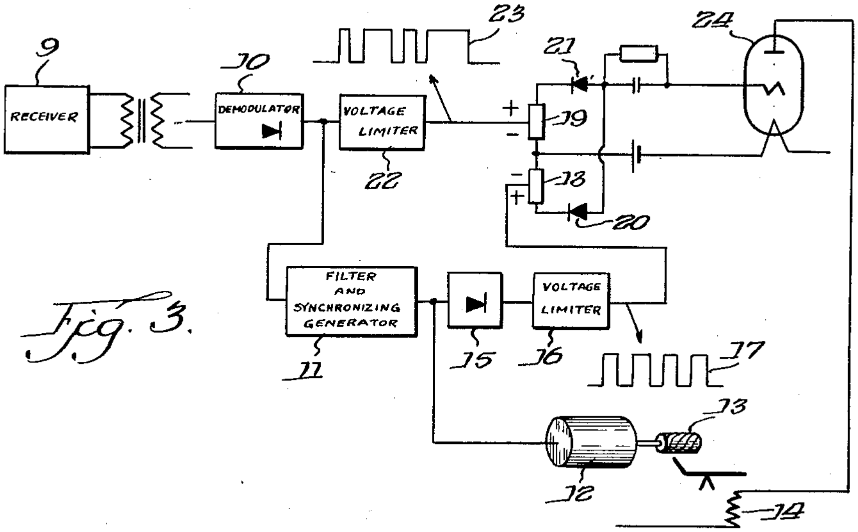
Fig. 3 illustrates in similar diagrammatic representation an example of a circuit arrangement for controlling the synchronous operation of the printer means at the receiver.

The mixed impulses generated by the arrangement shown in Fig. 1, comprising the symbol signal impulses and the superimposed impulses are transmitted to the receiver 9 shown in Fig. 3 and are distributed to two circuits after rectification in a suitable demodulator 10. One of the two circuits serves for synchronization of the printer motor 12, the circuit comprising a suitable filter and synchronizing generator 11 having desired filtering means for filtering out the impulse frequency of the superimposed impulses or of a multiple thereof. The generator is suitably controlled by the superimposed frequency which has thus been filtered out, producing an alternating current voltage which is synchronous with the impulse frequency transmitted. This alternating current voltage serves to drive the motor 12, which may be a synchronous motor, having a shaft on which is disposed the printing spindle 13 of the facsimile printer.

The alternating current voltage produced and synchronized by the generator 11 is utilized to filter out and to suppress the superimposed impulses in the circuit of the printer system 14 of the facsimile printer. The alternating current voltage is for this purpose conducted from the generator 11 over a suitable rectifier 15 to a suitable voltage limiter 16. By corresponding overload control of the alternating current there is produced at the output end of the rectifier 15 a rectangular impulse series having steep sides, the amplitude of which is brought to a predetermined value by the voltage limiter 16. The form of this impulse series as it occurs at the output end of the voltage limiter 16 is indicated at 17. Such impulse series is fed to the impedance 18 of a suitable modulator, e. g., of the ring modulator type, which also comprises an impedance 19 and two rectifiers 20 and 21. The mixed received impulses from the demodulator 10 are also fed to the voltage limiter 22 and the resulting mixed voltage is then conducted to the impedance 19. At the output end of the voltage limiter 22 is set up a mixed impulse series which is indicated by the curve 23. The superimposed frequency 17 has to be filtered out from this mixed impulse series. This is accomplished by the ring modulator which controls the actuation of the tube 24, the latter effecting the operation of the printer system 14 at the moment when a voltage is set up by the impulse series 17 or 23 at one or the other of the two impedances 18 and 19. The printer system 14 is thus operatively affected only by the symbol signal impulses, while the superimposed impulses are cancelled out in the ring modulator circuit.

Different means may be employed in place of those shown in Figs. 1 and 2, for accomplishing the same results.

For example, as shown in Fig. 2, a relay 35 having two windings connected at a common point to a current source 36, may be used at the transmission end in place of the bridge circuit shown in Fig. 1, the symbol signal impulses and the superimposed impulses acting on the respective windings of such relay, the circuit connections being so arranged that operative actuation is produced which corresponds to that of the bridge circuit. More particularly, the cam contacts 4 and 2 in Fig. 2 correspond to similarly numbered contacts in Fig. 1 and are acted upon by associated cams as shown in Fig. 1 (omitted in Fig. 2). The cam contact 4 is in series circuit with the left-hand winding of relay 35, and the contact 2 is similarly in series circuit with the right-hand winding of this relay. The current source may be any suitable and desired source, the battery 36 being indicated for the sake of convenience. The relay 35 is an ordinary non-polarized relay. The two windings are identical and are disposed in opposition. Accordingly, when current flows in both windings in the direction of the arrows, the relay will remain at normal. Operative actuation will result only from the energization of one or the other winding regardless of the direction of current flow through such winding. Contact 35*a* of the relay 35 will then be closed to connect an alternating current source 37 to the transformer 8 corresponding to the similarly numbered transformer in Fig. 1, and a signal will be transmitted as in the case of Fig. 1. Suitable valve relay means, e. g., a multivibrator arrangement, may also be employed to obtain the desired results.

The circuit means and arrangement at the receiving end, as shown in Fig. 3, may likewise be modified within the scope of the invention. For example, a suitable glow lamp generator analogously acted upon by the control frequency may take the place of the filter and synchronizing generator 11.

The motor 12 may be constructed as a synchronous motor, as indicated before, or as a tone wheel. The ring modulator may be dispensed with, e. g., by providing the printer system 14 with two windings which are acted upon by the two voltages 17 and 23 in such a manner that the printing means is operatively actuated only in the presence of symbol signal impulses acting on one of its windings, remaining inactive responsive to the energization of both of its windings.

Figure 4:
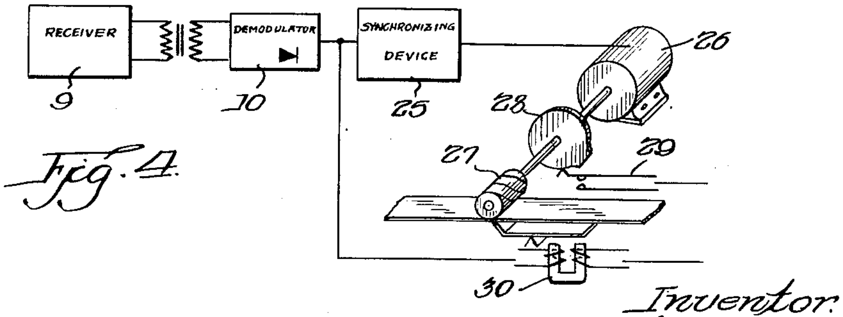
Fig. 4 indicates in diagrammatic manner essential parts of receiver circuit means employing modified synchronizing means.

Fig. 4 illustrates a modified receiver arrangement. Connected with the demodulator 10 which in turn is coupled with the receiver 9, as before, is a device 25 for effecting the synchronization by auxiliary scanning or sensing of the marginal zones of the symbol fields. It is assumed in this case that impulses are at regular intervals screened out from the superimposed impulses, at the transmission end, leaving the marginal zones or other suitable zones wholly or partially free. The arrangement controls a motor 26 which drives the printing spindle 27 of the facsimile printer. A cam 28 is disposed on the motor shaft for operatively actuating a contact 29 in step with the superimposed impulses. Synchronizing impulses are in this manner produced in one winding of the printer magnet 30, while the other winding is affected by the mixed received impulses. The two windings are suitably so connected as to cancel out the superimposed impulses.

The uniformity of the superimposed impulses is assured at the transmitter and at the receiver by identical form of the cams 4 and 28 shown in Figs. 1 and 3, respectively. The synchronous operation of these cams is assured by the circuit and switching means discussed before. The cams may be angularly adjustably mounted on their shafts so as to permit adjustments to compensate for phase differences that may result from structural tolerances of the apparatus.

An exchangeable single or adjustable multiple cam control may also be used at the receiver, which may be combined, if desired, with the arrangement shown in Fig. 3, to obtain the advantage of easily carrying out adjustments of the superimposed frequency, by exchange or adjustments of the corresponding cam means, in accordance with transmission speeds which vary in known manner, depending on transmission conditions.

It may be desirable to protect the owner of the equipment against unauthorized reception of transmitted messages. It is proposed for this purpose to construct readily removable parts of the receiving means in the form of unitary structures which may be put in charge of the operator at the discretion of the owner. Especially suitable for this purpose are the means serving the the unscrambling of the impulses, for example, the cam 28 of Fig. 4 or the ring modulator means of Fig. 3. The reading of a message is made difficult without these unscrambling means, due to the superimposed synchronizing impulses, thus giving a certain protection against unauthorized use of the service.

The transmitting arrangement is considerably simplified in the case of operating with negative printing and marginal zone synchronization, as described before. The symbols are arranged in negative form for coaction directly with the cam means 1 shown in Fig. 1, the marginal gaps acting thereby in the same manner as the symbol image signal impulses and causing no impulse transmission. In other words, the transmitter is provided with negative symbols. The cam 3 and also the mixing means 5—7 may then be omitted.

Changes may be made within the scope and spirit of the appended claims.

I claim:

1. In a teleprinter system of the class described, means for continuously transmitting successive series of signal impulses, means for superimposing series of synchronizing impulses on the series of signal impulses during the transmission thereof, receiver means comprising a printing spindle driven by a suitable motor and a printer magnet having two windings, means at the receiver for rectifying the fundamental frequency of said superposed impulses, means for controlling said rectified fundamental frequency to produce impulses having steep sides for driving said motor, limiter means for limiting the voltage of the fundamental frequency of said superposed impulses and the voltage of the mixed received impulses, respectively, to obtain similar amplitude thereof, and circuit means for controlling the two respective windings of said printing magnet being controlled by said signal impulses and by said rectified fundamental frequency, respectively.

2. In a facsimile system comprising a transmitter and a receiver, in which symbols are uniformly subdivided in the transmitter for the transmission of series of symbol-unit impulses corresponding to said subdivision and in which said series of symbol-unit impulses are successively reproduced in the receiver to form said symbols and in which synchronizing impulses are transmitted by the transmitter for synchronizing the operation of the receiver, said transmitter including means for producing said series of symbol-unit impulses and having impulse-generating means for continuously producing said synchronizing impulses, the amplitude of said synchronizing impulses corresponding to the amplitude of said symbol-unit impulses and the frequency of said synchronizing impulses bearing a fixed ratio to the subdivision of said symbols, circuit means for mixing said series of symbol-unit impulses and said synchronizing impulses and for transmitting said mixed impulses; said receiver including means for receiving said mixed impulses, circuit means forming a first and a second circuit branch to each of which said mixed impulses are directed, an impulse regenerator in said first circuit branch for producing from said mixed impulses series impulses of a frequency and phase position corresponding to those of the synchronizing impulses produced in the transmitter, for controlling the synchronous operation of said receiver, control means in the second circuit branch responsive to said mixed impulses and to said synchronizing impulses, respectively, for producing a series of symbol-unit impulses which corresponds to the symbol-unit impulse series transmitted to said receiver, and receiver printer means responsive to said last-named symbol-unit impulse series for forming the symbols corresponding thereto.

3. The system as set forth in claim 2, wherein the frequency of said synchronizing impulses corresponds to that of said symbol-unit impulses.

4. The system as set forth in claim 2, wherein the frequency of said synchronizing impulses forms an integral multiple of the frequency of said symbol-unit impulses.

5. The system as set forth in claim 2, wherein said synchronizing impulses are transmitted cophasally with said symbol-unit impulses.

6. The system as set forth in claim 2, together with control means in the transmitter for controlling the transmission of said synchronizing impulses and said symbol-unit impulses, said control means comprising a circuit responsive to said impulses, and means in said circuit for suppressing transmission in the simultaneous presence of a synchronizing impulse and a symbol-unit impulse.

7. The system as set forth in claim 2, together with control means in the transmitter for controlling the transmission of said synchronizing impulses and said symbol-unit impulses, said control means comprising a circuit responsive to said impulses, and means in said circuit for suppressing individual impulses of either series of impulses.

8. The system as set forth in claim 2, together with control means in the transmitter for controlling the transmission of said synchronizing and said symbol-unit impulses, said control means comprising a bridge circuit, two arms of said bridge circuit being respectively affected by said synchronizing and said symbol-unit impulses, and another arm of said circuit being common to said two arms for controlling the transmission of said impulses.

9. The system as set forth in claim 2, together with control means in the transmitter for controlling the transmission of said synchronizing and said symbol-unit impulses, said control means comprising a control relay having two windings, means for directing said synchronizing impulses to one of said windings, means for directing said symbol-unit impulses to the other winding, said relay remaining inoperative to suppress transmission in the simultaneous presence of a synchronizing impulse and a symbol-unit impulse.

10. The system as set forth in claim 2, wherein the impulse regenerator in said receiver comprises a discharge device and filter means.

11. The system as set forth in claim 2, wherein said receiver printer means comprises a magnet having two windings, means for rectifying the fundamental frequency of said synchronizing impulses, and circuit means for actuating one of said windings by said rectified fundamental frequency and the other winding by said symbol-unit impulses.

12. The system as set forth in claim 2, wherein said second circuit branch in the receiver comprises rectifier means and a discharge tube controlled thereby for producing said symbol-unit impulses to operate the receiver printer means.

13. The system as set forth in claim 2, wherein said receiver comprises a drive motor, cam means operated by said drive motor, a printer magnet having two windings, and circuit means controlled by said cam means for controlling said printer magnet.

References Cited in the file of this patent

UNITED STATES PATENTS

| Number | Name | Date |
|---|---|---|
| 2,372,762 | Brick | Apr. 3, 1945 |
| 2,506,269 | Finch | May 2, 1950 |
| 2,540,922 | Wickham | Feb. 6, 1951 |